UNITED STATES PATENT OFFICE 2,665,297

PROCESS OF PRODUCING ORGANIC UNSATURATED NITRILES

Peter Kurtz, Leverkusen-Bayerwerk, and Herbert Emil Eduard Schwarz, Leverkusen-Wiesdorf, Germany, assignors to Farbenfabriken Bayer Aktiengesellschaft, Leverkusen, Germany, a corporation of Germany No Drawing. Application October 24, 1950, Serial No. 191,919

Claims priority, application Germany October 28, 1949

4 Claims. (Cl. 260—465.7)

The present invention relates to a process of producing glutaconic acid dinitrile from 1,3-dichloro propene and to the various steps of that process.

It is an object of the present invention to produce glutaconic acid dinitrile from 1,3-dichloro propene. Another object is to provide a process for the production of glutaconic acid dinitrile on a technical scale from technically available and cheap starting materials.

A further object of the invention is to produce 1-chloro-3-cyano-propene-(1) from 1,3-dichloro propene.

A further object of the invention is to produce 1-chloro-3-cyano-propene-(2) from 1-chloro-3-cyano-propene-(1).

A further object of the invention is to produce glutaconic acid dinitrile from 1-chloro-3-cyano-propene-(2).

A further object of the invention is to produce 1-chloro-3-cyano-propene-(2) from 1,3-dichloro propene.

A still further object of the invention is to produce 1-chloro-3-cyano-propene-(2) from γ-chloro-β-hydroxy-butyric acid nitrile.

Further objects will become apparent to those skilled in the art as the following description proceeds.

Glutaconic acid dinitrile represents a hitherto scarcely used, very reactive, bifunctional organic compound which may find application as starting material for various organic reactions and syntheses, for instance, for the manufacture of dyestuffs, pharmaceutical products and plastics.

A process of preparing glutaconic acid dinitrile has been described for the first time by Lespieau (Bull. Soc. chim. France (4) 33, pages 725–733 (1923)). The same process has also been carried out by Legrand (Bull. Acad. roy. Belg. Cl. Sci. 29, pages 256–270 (1943)).

According to that process glutaconic acid dinitrile is obtained in three reaction steps while starting from epichlorhydrine. The process, however, is expensive and involves certain difficulties. Due to the very low yield of glutaconic acid dinitrile, the process has hitherto not gained practical importance.

The new process of producing glutaconic acid dinitrile from 1,3-dichloro-propene according to the present invention is carried out in several steps. The first step of the process consists in causing hydrocyanic acid, if desired in the form of alkali metal or alkaline-earth metal cyanides, to react upon 1,3-dichloro-propene or the crude reaction mixtures thereof as are obtained in the chlorination of propene, while avoiding a strongly alkaline reaction, in the presence of a cuprous salt, care being taken that the hydrogen chloride, in the rate as it is formed, is removed from the reaction mixture, which may be accomplished by chemical linkage. After separating from the reaction mixture in known manner the 1-chloro-3-cyano-propene-(1) thus produced, it is treated in the second step with catalytic amounts of a basic agent and of a weakly acid reacting substance or the reaction products thereof, whereby one of the said components may be used in excess. Hydrocyanic acid, if desired in the form of alkali metal or alkaline-earth metal cyanides, is then reacted in the third step upon the 1-chloro-3-cyano-propene-(2) thus obtained by rearrangement, directly or after separation from the said catalysts or from any by-products formed, while avoiding a strongly alkaline reaction, in the presence of cuprous salts, care being taken that the hydrogen chloride, in the rate as it is formed during reaction, is removed from the reaction mixture, which may be accomplished by chemical linkage. The glutaconic acid dinitrile thus obtained is separated in known manner from the reaction mixture. The new process proceeding smoothly in the individual steps and resulting in good yields allows the production of glutaconic acid dinitrile cheaply and in a technically simple manner.

The 1,3-dichloro-propene-(1) serving as starting material for the above-described process is formed as a by-product in the manufacture of 3-chloro-propene-(1) from propene by chlorination and may be obtained as the principal product by modification of this process (Ind. Eng. Chem. 31, pages 1530–1537 (1939)). The 1,3-dichloro-propene can easily be separated from the 3-chloropropene-(1).

The 3,3-dichloro-propene-(1) simultaneously formed in small amounts in this process can be converted into 1,3-dichloro-propene by heating with hydrochloric acid (Bull. Soc. chim. France (2) 36, page 557 (1881)). Of course, it is also possible to charge the mixture of the chloro propenes formed in the chlorination into the new process according to the present invention directly, since the reaction is not disturbed by the by-products of the chlorination.

1,3-dichloro-propene may also be obtained from dichlorohydrine by splitting off water (Bull. Soc. chim. France (4) 39, page 1547 (1926)).

The first step of the process according to the present invention, i. e. the reaction of 1,3-dichloro - propene to form 1 - chloro - 3 - cyano-propene-(1), is carried out according to a new process which consists in causing hydrocyanic acid, if desired in the form of alkali metal or alkaline-earth metal cyanides, to react upon 1,3-dichloro-propene in the presence of a cuprous salt while avoiding an alkaline reaction, care being taken that the hydrogen chloride at the rate as it is formed during the reaction, is removed from the reaction mixture, which may be accomplished by chemical linkage.

The reaction of compounds of the general formula

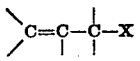

wherein X stands for a halogen, with hydrocyanic acid in an aqueous medium to form the nitriles of the general formula

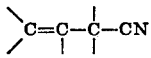

has already been described in U. S. Patent 2,477,672. The said specification does not disclose the reaction of 1,3-dichloro-propene. It could not be foreseen that 1-chloro-3-cyano-propene-(1) can be obtained from that compound without difficulty according to the said process. The said U. S. patent also discloses the reaction of allyl halides substituted at one of the terminal carbon atoms by a monohaloalkyl group. It further relates to the reaction of α-chloro-β-chloro-γ, γ-dichloro allylchloride. However, it could not be concluded therefrom that the reaction of 1,3-dichloro-propene proceeds in the same way as that of 3-chloro-propene-(1), because it is known that slight variations in the molecule of 3-chloro-propene-(1) by substitution fundamentally change the course of reaction of the compounds with CN-groups-containing substances; thus for instance, the reaction of 3-halogen propene-(1) compounds with alkali cyanides results in displacing the double linkage and in anionotropic rearrangements, as well as in undesired side-reactions, such as the addition of hydrocyanic acid (Chem. Review 42.2, page 200 etc. (1948)). However, the reaction with cuprous cyanide or with hydrocyanic acid proceeds without difficulty. If, however, substituents enter the molecule, the reaction scheme is quite different. For instance, by reacting 2,3-dichloro-propene-(1) with alkali cyanides only one defined product is obtained, viz. tricarballylic acid (Liebig's Annalen 170, page 126 (1873)). According to our observations, however, 1,3-dichloro-propene is completely resinified with alkali cyanides. The corresponding 2-methyl substituted derivative, 1,3 - dichloro - 2 - methyl-propene-(1) is probably resinified with alkali cyanides, or other hitherto undetermined side-reactions occur. We have come to that conclusion from the experiments by J. B. Cloke, E. Stehr, T. R. Steadman and L. C. Westcott (J. Am. Chem. Soc. 67, pages 1587-91 (1945)) who did not obtain unsaturated nitriles in the reaction of a mixture of 1,3-dichloro isobutane and 2-methyl-1,3-dichloro-propene-(1). The reaction of the corresponding 1-methyl substituted compound of 2,4-dichlorobutene-2 with alkali cyanides, however, proceeds with relatively good yields of 2-chloro-4-cyano-butene-2 (U. S. Patent 2,192,298). The behavior of these substituted chloro propenes towards cuprous cyanide or hydrocyanic acid has not been revealed as yet.

Only 1,3-dichloro-2-methyl propene-(1) forms an exception, which admixed with 1,3-dichloro isobutane was reacted according to Cloke et al. (loc. cit.) with cuprous cyanide. Besides tarry material they obtained a solid dinitrile and a liquid mononitrile of the composition C₅H₆NCl. In view of the fact that this substance shows a lachrymatory effect and gives in contact with the skin a stinging burning sensation, the latter compound can only be 1-chloro-2-methyl-3-cyano-propene-(2) which means that the double linkage has been displaced. It is evident from the above that, due to the different behavior of the various dihalogen propenes towards CN-containing substances, the behavior of 1,3-dichloro-propene towards hydrocyanic acid could not be foreseen.

When carrying out the process which comprises reacting 1,3-dichloro-propene and hydrocyanic acid, an alkaline reaction has to be avoided and care has to be taken that the halogen hydracid is removed from the reaction mixture in the rate as it is formed during reaction, which may be accomplished by chemical linkage. The reaction is performed in the presence of cuprous salts which term, however, in this connection is not restricted to cuprous halide. Hydrocyanic acid may be employed in its free form, preferably under excess pressure, or in form of cheap and readily available cyanides, such as alkali metal or alkaline-earth metal cyanides. When using such cyanides, the hydrocyanic acid formed in the reaction is immediately linked by the alkali metal or alkaline-earth metal. When working with free hydrocyanic acid whereby the hydrochloric acid is not chemically linked, removal of the hydrochloric acid may be achieved, for instance, by means of a diaphragm, by diffusion or by dialysis. It may be of advantage to carry out the reaction in the presence of a substance absorbing hydrogen chloride, in order to maintain a weakly acid reaction. For this purpose, besides many alkaline products, such as sodium hydroxide, potassium hydroxide, magnesium oxide or hydroxide, especially calcium oxide or hydroxide, may be used. Despite the fact that the hydrogen chloride is to be removed from the reaction mixture in the rate as it is formed, it is advisable to add a certain amount of hydrochloric acid, so as to avoid an alkaline reaction. Furthermore, the copper catalyst has proved to be most efficient, if cuprous cyanide and halogen hydracid (preferably hydrochloric acid) on the one hand, and cuprous halide (preferably cuprous chloride) and hydrocyanic acid on the other hand, are present in equilibrium. Dichloropropene is advantageously present in excess over the cyanide or hydrocyanic acid in the reaction mixture. Processing on a technical scale will generally be performed in an aqueous medium. However, the reaction may also be carried through in the liquid or gaseous phase with solid copper catalysts. The nitrile formed deposits in relatively pure form as an oily layer, whereas the copper salt remains in the aqueous mixture. When working with alkali metal or alkaline-earth metal cyanides, the cuprous halide is dissolved in the aqueous phase in the form of a complex salt. Processing is preferably performed at temperatures between 75 and 100° C., however, good results are also often attained when applying temperatures between 50 and 150° C.; higher temperatures require the application of pressure. The nitrile formed can be isolated, for instance, by steam distillation or by extraction with organic solvents. Very good yields are thus obtained. The process may be performed continuously.

In the process of the present invention copper is preferably employed in its cuprous form, which may be effected by adding some metallic copper or by excluding atmospheric oxygen. In some cases the amount of cuprous halide may be decreased. Though the reaction velocity is retarded thereby, the advantage is brought about that the expensive recovery of the copper can be dispensed with.

Isolation of 1-chloro-3-cyano-propene-(1) from the reaction mixture may be achieved in known manner by simply separating and extracting by means of suitable solvents, for instance benzene, or also by distilling off or by steam-distillation. The final product obtained by the reaction is 1-chloro-3-cyano-propene-(1), representing a new compound which is obtained in the form of the mixture of its stereo isomers, viz. the high-boiling and the low-boiling isomer of 1-chloro-3-cyano-propene-(1). When using, however, as a starting material, an isolated stereo isomer of 1,3-dichloro-propene, the reaction product contains an increased amount of the corresponding isomeric 1-chloro-3-cyano-propene-(1), which may be recovered therefrom in pure form by fractional distillation.

The second step of our new process for preparing glutaconic acid dinitrile from 1,3-dichloro-propene, viz. the conversion of 1-chloro-3-cyano-propene-(1) into 1-chloro-3-cyano-propene-(2), is accomplished according to another new process which comprises treating 1-chloro-3-cyano-propene-(1) with catalytic amounts of a mixture of strongly basic agents and of weakly acid reacting substances or the reaction products thereof, wherein one of the two components may be applied in excess.

It is known to convert 3-cyano-propene-(1) into 3-cyano-propene-(2) by means of a mixture of phenol and phenol sodium (Bull. Soc. chim. Belg. 31, page 227 (1922)). This conversion can also be effected by many other alkaline reacting substances (Bull. Soc. chim. Belg. 33, page 331 (1924)).

We have found that the conversion of a 3-cyano-propene-(1) substituted in the 1-position by chlorine into the 1-chloro-3-cyano-propene-(2) proceeds differently to some degree from that of 3-cyano-propene-(1). Many of the alkaline reacting substances that are active for converting 3-cyano-propene-(1) are here ineffective or, besides the conversion, simultaneously effect exchange of the chlorine atom which is very reactive and mobile in the rearranged product. The principal feature of this part of our invention resides in the discovery that the conversion of 1-chloro-3-cyano-propene-(1) into 1-chloro-3-cyano-propene-(2) is accomplished in a good yield and without the formation of by-products, if catalytic amounts of a mixture of strongly basic agents and of weakly acid reacting substances hereinafter described are used.

As basic substances for carrying out the second part of the process of the present invention, there may be used strongly alkaline reacting agents, such as alkali metal and alkaline-earth metal hydroxides or oxides, as well as strong organic bases, such as aliphatic and aromatic amines. Weakly acid reacting substances include in this connection organic compounds that cannot be regarded as proper acids, but which are capable of forming more or less stable compounds with alkali metals. There may be mentioned hydroxy- or sulfhydryl-groups-containing compounds, such as phenols and mercaptans, for instance, phenol, the cresols, the xylenols, thiophenol, the thiocresols, the thioxylenols, aliphatic mercaptans, furthermore, acid amides and imides, especially of aromatic acids, such as benzene sulfonamide, benzene sulfonimide, phthalimide, and also other compounds, such as aliphatic sulfinic acids, for instance ethyl sulfinic acid, and acetylene, and particularly derivatives of the latter, for instance phenyl acetylene. Besides the said compounds, also aromatic sulfinic acids, aliphatic sulfonamides and imides are highly effective. Especially suitable are the alkali phenolates or mixtures thereof with phenol which show a high activity and are readily available. It is of no consequence whether phenol or its homologues are employed.

Reaction products of basic and weakly acid reacting compounds include in this connection the salts or salt-like compounds which are obtained from the said components on mixing same, as well as those obtainable, for instance, by reaction of the weakly acid reacting substances with the alkali metal or with an alcoholate, etc.

The very reactive chlorine atom of the 1-chloro-3-cyano-propene-(2) surprisingly does not react under the above mentioned conditions with the catalytic amounts of the basic components, for instance with the sodium of the sodium phenolate to form the inactive sodium chloride, but the catalyst retains its activity until the reaction is complete.

The conversion of 1-chloro-3-cyano-propene-(1) to 1-chloro-3-cyano-propene-(2) can be achieved without difficulty only when employing the mixture of a strong base and a weakly acid reacting agent as hereinbefore described. We have discovered that the double linkage of 1-chloro-3-cyano-propene-(1) is also displaced, for instance, by means of organic bases alone, however, in this case, the chlorine atom standing in 1-position is simultaneously exchanged against the radical of the base. For instance, when attempting to accomplish the rearrangement with small amounts of piperidine, chemical linkage of piperidine immediately takes place and no further rearrangement can occur. By increasing the amount of piperidine the chloro hydrate of 1-piperidylo-3-cyano-propene-(2) is obtained in an almost quantitative yield. Other organic bases and also, for instance, the alkali salts of organic acids react in the same way. The latter products yield the corresponding 1-acoyl-compounds. This observation has been made subject of another application.

The above conclusion, viz. that differently substituted allyl derivatives often behave differently towards chemical influences, and that the course of reaction with alkaline substances and the displacement of the double linkage could not be predicted from the close relationship of two compounds, is also true in this case.

The reaction is carried out with catalytic amounts of the said mixtures or the reaction products thereof, preferably with 2-5 per cent by weight calculated on the 1-chloro-3-cyano-propene-(1) charged. However, it is also possible to use larger or smaller amounts of the catalyst without attaining special advantages thereby. The bases and the weakly acid reacting substances are mostly used in equimolar quantities. However, it may sometimes be of advantage to use one of the components in an excess which may amount to a fraction or also to the multiple of the quantity of the other reactants. Thus, it may be of advantage when using phenol to charge an excess of free phenol or when using sulfinic acids to charge a slight excess of the bases.

The reaction is often initiated without outside heating, whereby the temperature of the reaction mixture rises by the heat of reaction developed. However, the reaction velocity may be increased by heating. Provided that the catalysts are charged in appropriate amounts and combinations, the reatcion proceeds quantitatively without side-reactions occurring. It is often of advantage to carry out the reaction in the presence of a solvent. The reaction is not disturbed by water.

1-chloro-3-cyano-propene-(2) has been described for the first time by Lespieau (Bull. Soc. chim. France (3) 33, page 466 (1905)). The process according to Lespieau consists in preparing 1-chloro-3-cyanopropene-(2) from epichlorohydrine by addition of hydrocyanic acid and splitting off water, which may be achieved by treatment with phosphorus pentoxide. The yields according to this process are only low. 1-chloro-3-cyano-propene-(2) may likewise be obtained in low yield by chlorinating 3-cyano-propene-(2) at high temperature (U. S. Patent 2,466,641).

The application of phosphorus pentoxide in the preparation of 1-chloro-3-cyano-propene-(2) shows some disadvantages. On the one hand, processing can only be performed in small batches and, on the other hand, the application of phosphorus pentoxide when working on a technical scale is very expensive. We have found that these disadvantages are avoided and essentially better yields are obtained by esterifying $\beta$-hydroxy-$\gamma$-chloro-carboxylic acid nitrile with readily volatile acids and subjecting these esters in the form of vapor to temperatures between 350 and 600° C. It has already been known to prepare $\alpha,\beta$-unsaturated nitriles by esterifying the hydroxy group in nitriles of $\alpha$-hydroxy carboxylic acid with a volatile acid, and splitting off the acid from the esters thus obtained. However, it could not be foreseen that only the carboxylic acid is split off by the thermal treatment of $\gamma$-chloro-$\beta$-hydroxy-nitriles wherein the hydroxy group is esterified, whereas the very mobile $\gamma$-chlorine atom of the 1-chloro-3-cyano-propene-(2) formed is kept unchanged.

$\gamma$-chloro-$\beta$-hydroxy-nitriles are easily obtainable. For instance, $\beta$-hydroxy-$\gamma$-chloro butyric acid nitrile is obtained from epichlorohydrine and hydrogen cyanide in excellent yield. (cf. for in instance Rambaud, Bulletin de la Société Chimique de France, vol. (5) 3, page 138 (1936).)

As volatile acids, there may be used for this new process, in the first line, organic mono or polybasic acids, such as acetic acid, benzoic acid, phthalic acid or also inorganic acids, such as sulfurous acid and carbonic acid.

The said esters are split off at temperatures between 350 and 600° C., preferably between 400 and 480° C., for instance by passing the vapor of the ester through a cylindrical, extended reaction chamber which may be filled with pieces of quartz, activated charcoal or silica gels etc. It may be of advantage to operate under reduced pressure or to dilute the vaporized substance with inert gases. The splitting off of hydrogen chloride is completely avoided by feeding the vapor so as to obtain a sufficiently high vapor velocity within the reaction zone.

The third step of the new process according to the present invention for the production of glutaconic acid dinitrile from 1,3-dichloro-propene-(1), viz. the reaction of 1-chloro-2-cyano-propene-(2) with hydrocyanic acid, is accomplished by a new process which comprises causing hydrocyanic acid, if desired in form of alkali metal or alkaline-earth metal cyanides, upon 1-chloro-3-cyano-propene-(2) in the presence of cuprous salts while avoiding an alkaline reaction, care being taken that the hydrogen chloride is removed from the reaction mixture in the rate as it is formed during reaction, which may be attained by chemical linkage.

As already described in the foregoing, the substituents directly attached to a double linked C-atom exert a strong effect on the course of reaction of 3-halopropene-(1)-compounds with CN-containing reagents. Therefore, the behavior of the 3-halo-propene-(1)-compounds substituted by cyano groups at the double linked carbon atoms could not be foreseen. By reacting these compounds with alkali metal cyanides resinous compounds only are obtained.

The conditions to be applied in the reaction of 1-chloro-3-cyano-propene-(2) with hydrocyanic acid correspond to those described hereinbefore for the reaction of 1,3-dichloro-propene-(1) with hydrocyanic acid in weakly acid aqueous medium with the addition of cuprous chloride as catalyst, with the reservation that isolation in the reaction of 1-chloro-3-cyano-propene-(2) with hydrocyanic acid cannot be achieved by steam distillation as described above, since the glutaconic acid dinitrile is not volatile with steam. Therefore, the glutaconic acid dinitrile is advantageously isolated from the reaction mixture by simply separating the glutaconic acid dinitrile floating on the aqueous solution and/or by extracting with an organic solvent, for instance, benzene, toluene or with chlorinated hydrocarbons, for instance, chloroform or carbontetrachloride. Non-reacted starting products are preferably separated from the reaction mixture by treatment with steam.

The process according to the present invention for the production of glutaconic acid dinitrile from 1,3-dichloro-propene-(1) may be modified in most various ways. Thus, for instance, isolation and purification of the reaction products formed in each step can be dispensed with. Of course, 1-chloro-3-cyano-propene-(1) and 1-chloro-3-cyano-propene-(2) may also be obtained according to our invention, as the principal products. It is also possible to charge starting materials in the various steps of the process, which have been obtained in another manner. Thus, for instance, epichlorohydrin obtainable in known manner from glycerine or propylene may be converted into glutaconic acid dinitrile by the addition of hydrocyanic acid to epichlorohydrin and by splitting off the hydroxyl group by treatment with phosphorus pentoxide or by thermal treatment of the product esterified at the hydroxyl group with readily volatile acids, a double linkage being effected and the above-mentioned 1-chloro-3-cyano-propene-(2) being obtained thereby. 1-chloro-3-cyano-propene-(2) can be converted into glutaconic acid dinitrile as described above.

The present invention is further illustrated by the following examples without being restricted thereto, the parts being by weight.

Example 1

40 parts of copper-(I)-chloride, about 2–4 parts of copper powder and about 5 parts of concentrated hydrochloric acid are introduced into 500 parts of a saturated common salt solution heated to 80–100° C. with the exclusion of oxygen. Thereto are added 100 parts of an aqueous sodium cyanide solution (about 37 per cent by weight) and hydrochloric acid in such an amount (10–20 parts) that a pH-value of 3–4 (measured by means of a glass electrode) is obtained. Thereupon are added at once 1000 parts of a mixture consisting of high and low boiling 1,3-dichloro-propene-1 boiling at 104–114° C. under 760 mm. pressure. Further 810 parts of the said sodium cyanide solution are gradually added, depending on how the reaction proceeds, i. e. while keeping a pH-value of 3–4.

After completion of the reaction, i. e. after about 7 hours, the oil is extracted from the reaction solution with benzene and the residue remaining after distillation of the benzene solution is fractionated. 628 parts (corresponding to 68.5% of the theoretical) of 1-chloro-3-cyano-propene-1 boiling at 58–70° C. under 11 mm. pressure and having a refractive index of $N_D^{20}=1.4610$, $d_4^{20}=1.127$ are obtained. The 1-chloro-3-cyano-propene-(1) thus obtained is a mixture of the stereoisomeric compounds.

| found | calculated on $C_4H_4NCl$ |
|---|---|
| *Percent* | *Percent* |
| C=47.45 | C=47.3 |
| H= 4.20 | H= 3.9 |
| N=13.40 | N=13.8 |
| Cl=34.70 | Cl=35.0 |

Example 2

On carrying out the reaction described in Example 1 with 1000 parts of high-boiling 1,3-dichloro-propene-(1) (boiling point 110–112° C. under 760 mm. pressure) instead of a mixture of the low-boiling and high-boiling 1,3-dichloro-propene-(1), and while using 1180 parts of the sodium cyanide solution, 746 parts high-boiling 1-chloro-3-cyano-propene-(1) (boiling point 62–71° C./11 mm., $N_D^{20}=1.4605$) are obtained. The yield corresponds to 82% of the theoretical. By fractional distillation of the crude reaction product the pure high-boiling 1-chloro-3-cyano-propene-(1) is obtained. Boiling point 66.3–67° C./11 mm., $N_D^{20}=1.4610$.

Example 3

20 parts of copper-(I)-chloride, about 2–4 parts of copper powder and about 5 parts of concentrated hydrochloric acid are introduced while excluding oxygen into 1000 parts of a saturated common salt solution heated to 90–100° C. Thereto are added 100 parts of the sodium cyanide solution mentioned in Example 1 and hydrochloric acid in such an amount (about 10–20 parts) that a pH-value of 3–4 (measured by means of a glass electrode) is obtained. Thereto 1000 parts of low-boiling 1,3-dichloro-propene-(1) boiling at 104–106° C./760 mm. are gradually added and a further 620 parts of the sodium cyanide solution are gradually added as described in Example 1. After isolation, as indicated in Example 1, 394 parts (corresponding to 43% of the theoretical) of 1-chloro-3-cyano-propene-(1) boiling at 60–69° C. are obtained. By fractional distillation the pure low-boiling 1-chloro-3-cyano-propene-(1) is obtained. Boiling point 60–60.5° C./11 mm., $N_D^{20}=1.4582$.

Example 4

50 parts of sodium phenolate are added at once at room temperature with stirring to 1000 parts of 1-chloro-3-cyano-propene-(1) boiling at 58–70° C./11 mm. The temperature rises to 77° C. within some minutes. By distillation 933 parts (corresponding to 93% of the theoretical) of a mixture consisting of low-boiling and high-boiling 1-chloro-3-cyano-propene-(2) are obtained, boiling between 50 and 70° C./11 mm., $N_D^{20}=1.4780$. High-boiling 1-chloro-3-cyano-propene-(2) prepared according to prior art processes shows the following physical data: Boiling point 73–73.3° C./11 mm., $N_D^{20}=1.4818$, $d_4^{20}=1.128$.

Low-boiling 1-chloro-3-cyano-propene-(2) obtained by fractionated distillation from said mixture shows the following data: Boiling point 57–57.5° C./11 mm., $N_D^{20}=1.4750$, $d_4^{20}=1.121$.

Example 5

1.5 parts of phenol and 0.5 part of sodium phenolate are added at room temperature with stirring to 40 parts of 1-chloro-3-cyano-propene-(1) (boiling between 58 and 70° C./11 mm.). The temperature of the reaction mixture rises by about 5° C. The reaction mixture is shortly heated to 80° C. and subsequently distilled in vacuo. 37 parts of crude 1-chloro-3-cyano-propene-(2) boiling between 54 and 74° C./11 mm. and having a refractive index of $N_D^{20}=1.4760$ are thus obtained.

Example 6

2.5 parts of sodium phenolate are added with stirring at room temperature to a solution of 50 parts of 1-chloro-3-cyano-propene-(1) (boiling between 58 and 70° C./11 mm.) in 100 parts of benzene. The temperature of the reaction mixture rises by about 3 centigrades. The reaction mixture is then shortly heated to 80° C., the benzene is distilled off and the residue is subsequently distilled in vacuo. 48 parts of crude 1-chloro-3-cyano-propene-(2) boiling between 50 and 70° C./11 mm. and having a refractive index of $N_D^{20}=1.4760$ are obtained.

Example 7

A solution of 2.5 parts of sodium phenolate in 50 parts of water is added with stirring at room temperature to 50 parts of 1-chloro-3-cyano-propene-(1) boiling at 50–70° C./11 mm. The reaction mixture is further stirred for one hour at 80° C. and distilled with steam, 45 parts of a mixture of 1-chloro-3-cyano-propene-(2) and unchanged starting material being obtained thereby. $N_D^{20}=1.4720$.

Example 8

5 parts of the dry sodium compound of benzene sulfonamide are added with stirring to 50 parts of 1-chloro-3-cyano-propene-(1). The mixture is heated to 80° C. for two hours with stirring. By distilling in vacuo 43 parts of crude 1-chloro-3-cyano-propene-(2) boiling between 55–75° C./11 mm. are obtained. $N_D^{20}=1.4750$.

*Example 9*

50 parts of 1-chloro-3-cyano-propene-(1) are mixed with 4 parts of phenol and 1 part of piperidine. The mixture is heated to 60° C. for one hour and distilled 50 parts of a mixture of 1-chloro-3-cyano-propene-(2) and unchanged starting material (boiling between 63–80° C./10 mm.) are obtained. $N_D^{20}=1.4720$.

*Example 10*

50 parts of 1-chloro-3-cyano-propene-(1) are mixed with 3 parts of phthalimide potassium. The mixture is heated to 60° C. for one hour and distilled. 42.8 parts of a mixture of 1-chloro-3-cyano-propene-(2) and unchanged starting material boiling between 60–70° C. are obtained. $N_D^{20}=1.4710$.

*Example 11*

3 parts of the sodium compound of phenyl acetylene are added to 50 parts of 1-chloro-3-cyano-propene-(1). The mixture is heated to 60° C. for one hour and distilled. 43.3 parts of a mixture of unchanged 1-chloro-3-cyano-propene-(1) and of 1-chloro-3-cyano-propene-(2) (boiling between 60–63° C./10 mm.) are obtained. $N_D^{20}=1.4675$.

*Example 12*

3 parts of phenol and 0.5 part of calcium oxide are added to 50 parts of 1-chloro-3-cyano-propene-(1). The mixture is heated to 80° C. for one hour and distilled. 49.5 parts of a mixture of unchanged 1-chloro-3-cyano-propene-(1) and of 1-chloro-3-cyano-propene-(2) (boiling between 61 and 78° C./10 mm.) are obtained. $N_D^{20}=1.4660$.

*Example 13*

5 parts of the sodium salt of ethyl-sulfinic acid and 3 parts of powdered caustic soda are added to 50 parts of 1-chloro-3-cyano-propene-(1). The temperature of the mixture spontaneously rises to 92° C. and is subsequently kept at 80° C. for one hour. 30 parts of crude 1-chloro-3-cyano-propene-(2) (boiling between 57 and 67° C./10 mm.) are obtained by distillation. $N_D^{20}=1.4710$.

*Example 14*

3 parts of the sodium compound of hexane dithiol are added to 50 parts of 1-chloro-3-cyano-propene-(1) the temperature of the mixture rising thereby to 55° C. The mixture is further stirred at 80° C. for one hour. By distillation 45.5 part of crude 1-chloro-3-cyano-propene-(2) (boiling between 60 and 65° C.) are obtained. $N_D^{20}=1.4730$.

*Example 15*

50 parts of 1-chloro-3-cyano-propene-(1) are mixed with 3 parts of the sodium compound of 1-mercapto-hexanol-(6). The temperature of the mixture rises to about 50° C. The mixture is stirred at 80° C. for another hour. 44 parts of crude 1-chloro 3-cyano-propene-(2) (boiling between 58 and 72° C./10 mm. pressure) are obtained by distillation. $N_D^{20}=1.4715$.

*Example 16*

2 parts of o-thiocresol and 1 part of powdered caustic soda are mixed with 50 parts of 1-chloro-3-cyano-propene-(1). The mixture is kept at 80° C. for one hour and distilled. 43 parts of a mixture of unchanged 1-chloro-3-cyano-propene-(1) and of 1-chloro-3-cyano-propene-(2) (boiling between 60 and 75° C./10 mm.) are obtained. $N_D^{20}=1.4695$.

*Example 17*

5 parts of copper-(I)-chloride and some copper powder are added to 1200 parts of a saturated common salt solution whereby the copper salt is completely reduced. The solution is then heated to about 80° C. and mixed with about 24 parts of concentrated hydrochloric acid and about 59 parts of a 40% sodium cyanide solution. 220 parts of 1-chloro-3-cyano-propene-(2) (prepared according to Example 21) are added at once and a further about 216 parts of the 40% sodium cyanide solution are gradually added with good stirring. The rate of feeding the sodium cyanide solution so as to keep the pH-value at about 3 to 4 is adjusted as indicated in Example 1. After about 18 hours the oil floating on the hydrochloric acid solution is completely extracted with benzene and separated from the unchanged starting material by fractional distillation after distilling off the solvent. The first fraction (50–80° C.) are 55.3 parts of unchanged 1-chloro-3-cyano-propene-(2). The second fraction consists of 117.9 parts of glutaconic acid dinitrile corresponding to a yield of 59% calculated on the 1-chloro-3-cyano-propene-(2) charged and 71.5% calculated on the sodium cyanide charged. The total yield calculated on the 1-chloro-3-cyano-propene-(2) including the amount of the recovered starting material amounts to 79%.

*Example 18*

According to the working method described in Example 1, 1000 parts of 1,3-dichloro-propene-(1), boiling at 106–116° C. (crude product obtained by chlorination of propylene) are added to a mixture of 500 parts of cuprous chloride, 500 parts of saturated common salt solution, 20 parts of cuprous chloride, some copper powder and small quantities of hydrochloric acid and reacted with 1380 parts of a 25% sodium cyanide solution. The reaction mixture is subsequently treated with steam, the oil of the distillate is separated from water and distilled after drying with calcium chloride.

Thus 628 parts of 1-chloro-3-cyano-propene-(1) boiling at 50–70° C. under 11 mm. pressure ($N_D^{20}=1.4610$) are obtained, which product is reacted with 32 parts of sodium phenolate in accordance with the working method described in Example 4. By distilling of the reaction mixture 588 parts of a mixture of the stereoisomers of 1-chloro-3-cyano-propene-(2), boiling at 50–75° C./10 mm., $N_D^{20}=1.4780$, are obtained which still contains small amounts of 1-chloro-3-cyano-propene-(1). The said mixture of 1-chloro-3-cyano-propene-(2) is then gradually added in accordance with the working method described in Example 17 at 90–100° C. to a mixture consisting of 40 parts of cuprous chloride, 500 parts of saturated common salt solution, to which some copper powder and concentrated hydrochloric acid has been added, and reacted with 570 parts of a 30% sodium cyanide solution. After completion of the reaction the reaction product formed is extracted with benzene. For removing small amounts of copper salt the benzene solution is washed with a solution of potassium ferro cyanide and subsequently a few drops of phosphoric acid and a trace of pyrogallol are added. The solvent is distilled off and the residue fractionated. 279 parts of first running substantially consisting of a mixture of 1-chloro-3-cyano-propene-(1) and 1-chloro-3-cyano-propene-(2) boiling within 50–80° C./10 mm. are obtained. Then at 110–135° C./10 mm. 208 parts of glutaconic acid dinitrile distil over. The total yield of glutaconic acid dinitrile amounts to 47.5% calculated in the 1,3-dichloro-propene-(1) used including the first runnings which are used again in the process.

*Example 19*

1000 parts of 1,3-dichloro-propene-(1) are reacted in accordance with the working method described in Example 1 with 1172 parts of a 30% sodium cyanide solution in a mixture of 500 parts of saturated common salt solution and 40 parts of cuprous chloride. By treating the reaction mixture with steam, 650 parts of 1-chloro-3-cyano-propene-(1) are obtained as distillate. The crude moist distillate is then rearranged to 1-chloro-3-cyano-propene-(2) in accordance with the method described in Example 4. The dark colored product which has been rearranged is then reacted without further purification with 741 parts of a 24% sodium cyanide solution in a mixture of 30 parts of cuprous chloride in 1000 parts of a saturated sodium chloride solution in accordance with the methods described in Example 17. 124 parts of glutaconic acid dinitrile are obtained.

*Example 20*

80 parts of cuprous chloride are dissolved in 500 parts of a sodium chloride solution according to the precautionary measures described in Example 1 and 200 parts of a sodium chloride solution (25%) are added. The solution is adjusted to a pH-value of 3–4 by means of concentrated hydrochloric acid and 1000 parts of 1,3-dichloro-propene-(1) boiling at 106–116° C. are added and reacted at 80–90° C. with additional quantities of sodium cyanide solution according to the conditions described in Example 1; 91% of the theoretical quantity of sodium cyanide being required for carrying out this reaction. The mixture is treated with steam and the oily distillate is redistilled after drying. Besides a first running of 47 parts (boiling at 30–58° C./11 mm., 655 parts of 1-chloro-3-cyano-propene-(1) boiling at 58–67° C./11 mm., $N_D^{20}=1.4605$ are obtained. The yield amounts to 71.5% of the theoretical. The product is then mixed with 30 parts of sodium phenolate. Thereby the temperature rises to 80° C. By distillation 640 parts of 1-chloro-3-cyano-propene-(2) boiling at 58–67° C./11 mm., $N_D^{20}=1.4810=98\%$ of the theoretical are obtained. The yield calculated on the dichloro-propene charged amounts to 70%.

*Example 21*

β-hydroxy-γ-chloro butyric acid nitrile is reacted with acetic anhydride and some sulfuric acid serving as catalyst to form the acetic acid ester (B. P. 122–124° C./14 mm.). The yield amounts to 86%.

60–80 grams per hour of the β-acetoxy-γ-chloro butyric acid nitrile thus obtained are evaporated under a pressure of 14 mm. Hg. The vapors are passed through a quartz tube filled with quartz pieces. The internal temperature of the tube having a length of about 70 cm. condensed reaction product is fractionated in vacuo. The first fraction (up to a boiling point of 100° C./17 mm.) consists of a mixture of acetic acid and 1-chloro-3-cyano-propene-(2). The quantity of this fraction amounts, on an average, to two thirds of the quantity of starting material charged within the unit of time. The residue of the distillation—about one third of the initial amount—mostly consists of unchanged β-acetoxy-γ-chloro butyric acid nitrile which may be passed once more through a quartz tube.

The said mixture of acetic acid and 1-chloro-3-cyano-propene-(2) is fractionated. A first running consisting of acetic acid and two fractions of γ-chloro crotonic acid nitrile are obtained.

The first fraction consists of the hitherto unknown low-boiling 1-chloro-3-cyano-propene-(2); boiling point 57–57.5° C./12 mm., $N_D^{20}=1.4750$, $d_4^{20}=1.121$

| found | calculated on $C_4H_4NCl$ |
|---|---|
| Percent | Percent |
| C=47.4 | C=47.3 |
| H= 4.0 | H= 3.9 |
| N=13.54 | N=13.8 |
| Cl=34.55 | Cl= 3.5 |

The second fraction consists of high-boiling 1-chloro-3-cyano-propene-(2); boiling point 73–73.3° C./12 mm., $N_D^{20}=1.4818$, $d_4^{20}=1.128$.

The total yield of 1-chloro-3-cyano-propene-(2) amounts to more than 80% of the reacted amount of β-acetoxy-γ-chloro butyric acid nitrile.

*Example 22*

1000 parts of the high-boiling 1-chloro-3-cyano-propene-(2) obtained as indicated in Example 21, are added to a mixture of 60 parts of cuprous chloride, 2000 parts of saturated common salt solution, at a temperature of 100° C. and reacted as described in example with 2100 parts=98% of the theoretical of a sodium cyanide solution (34%). The reaction product is worked up as already described in Example 17. Besides a first running of 65 parts of unchanged starting material 1047 parts of glutaconic acid dinitrile boiling at 90–114° C./14 mm., are obtained as an oily liquid. The yield amounts to 77%. By freezing this liquid 700 parts of the known glutaconic acid dinitrile melting at 32° C. are obtained. The remaining 347 parts of liquid are a steroisomer of glutaonic acid dinitrile which hitherto was not known.

The liquid glutaconic acid dinitrile shows the following values:

| found | calculated on $C_5H_4N_2$ |
|---|---|
| Percent | Percent |
| N=30.1 | N=30.4 |

When treating the said product with hydrogen bromide in glacial acetic acid, the β-bromoglutaric acid dinitrile hydrobromide melting at 222° C., and from the latter product the β-bromoglutaric acid dinitrile melting at 88–90° C. is obtained in accordance with Lespieau (cf. Bull. Soc. Chim. France (4), 33, page 729 (1923)).

*Example 23*

To a mixture of 15 parts of cuprous chloride, 1000 parts of a saturated common salt solution, copper powder and hydrochloric acid, 485 parts of the low-boiling 1-chloro-3-cyano-propene-(2) obtained according to Example 21, are added and reacted with 532 parts of a 35.2% sodium cyanide solution as indicated in Example 17. On distillation besides a first running of 73 parts of unchanged starting material 228 parts of liquid glutaconic acid dinitrile are obtained. The yield amounts to 52%.

We claim:

1. The process which comprises adding to 1-chloro-3-cyano-propene-(1) catalytic amounts of an alkali phenolate and heating the reaction mixture to a temperature not exceeding 150° C.

2. The process which comprises adding to 1-chloro-3-cyano-propene-(1) catalytic amounts of phenol and an alkali phenolate and heating the reaction mixture to a temperature not exceeding 150° C.

3. The process which comprises adding to 1-chloro-3-cyano-propene-(1) catalytic amounts of a mixture of phenol and an alkali phenolate, one of the components being applied in excess, and heating the reaction mixture to a temperature not exceeding 100° C.

4. The process which comprises adding to 1-chloro-3-cyano propene-(1) catalytic amounts of a mixture of phenol and sodium phenolate, heating the reaction mixture to a temperature not exceeding 100° C., and separating the 1-chloro-3-cyano-propene-(2) thus obtained from the by-products.

PETER KURTZ.
HERBERT EMIL EDUARD SCHWARZ.

References Cited in the file of this patent

UNITED STATES PATENTS

| Number | Name | Date |
|---|---|---|
| 2,384,630 | Mahan | Sept. 11, 1945 |
| 2,466,641 | Hearne | Apr. 5, 1949 |
| 2,477,672 | Webb et al. | Aug. 2, 1949 |
| 2,478,285 | Langkammerer | Aug. 9, 1949 |

OTHER REFERENCES

Lespieau, Bull. Soc. Chim. de France (3) vol. 33, p. 466 (1905).

Lespieau, Beilstein (Handbuch, 4th Ed.), vol. II, p. 408 (1920).